United States Patent
Jehlicka (10) Patent No.: US 9,435,452 B2
(45) Date of Patent: Sep. 6, 2016

(54) IGNITION REDUCING SHUT-OFF VALVE (71) Applicant: GCE Holding AB, Malmo (SE)

(72) Inventor: Petr Jehlicka, Zdirec Nad Doubravou (CZ)

(73) Assignee: GCE Holding AB, Malmo (SE)

( * ) Notice: Subject to any disclaimer, the term of this patent is extended or adjusted under 35 U.S.C. 154(b) by 291 days.

(21) Appl. No.: 14/021,559

(22) Filed: Sep. 9, 2013

(65) Prior Publication Data

US 2014/0077113 A1    Mar. 20, 2014

(30) Foreign Application Priority Data

Sep. 14, 2012 (EP) .................................... 12184505

(51) Int. Cl.
  *F16K 21/04* (2006.01)
  *F16K 3/26* (2006.01)
  *F16K 1/30* (2006.01)

(52) U.S. Cl.
  CPC ............... *F16K 21/04* (2013.01); *F16K 1/305* (2013.01); *F16K 3/265* (2013.01); *F16K 3/267* (2013.01); *Y10T 137/86775* (2015.04)

(58) Field of Classification Search
  CPC ........ F16K 21/04; F16K 1/305; F16K 3/267; F16K 3/265; Y10T 137/86759; Y10T 1/86767; Y10T 1/86775
  USPC .................................................. 251/157, 324
  See application file for complete search history.

(56) References Cited

U.S. PATENT DOCUMENTS

| 1,698,616 A | * | 1/1929 | Woodham | ............... F16K 17/10 137/329.4 |
| 2,906,289 A | * | 9/1959 | Fox | ....................... F16K 17/044 137/508 |
| 3,211,175 A | * | 10/1965 | Replogle | .................. A62B 9/02 137/493 |
| 3,693,659 A | * | 9/1972 | Parola | ....................... F16K 3/22 137/625.3 |
| 3,930,517 A | * | 1/1976 | Gagala | .................... F17C 13/04 137/329.4 |
| 4,077,422 A | * | 3/1978 | Brinkley | ................. F16K 17/30 137/68.14 |
| 4,907,617 A | * | 3/1990 | Whalen | ................. F16K 17/406 137/68.11 |
| 5,934,643 A | * | 8/1999 | Cooke | .................. F02M 47/027 239/585.5 |
| 2004/0144944 A1 | | 7/2004 | Roethel et al. | |
| 2005/0127113 A1 | * | 6/2005 | Piette | ...................... F16K 1/305 222/402.1 |

FOREIGN PATENT DOCUMENTS

| DE | 10354229 A1 | 6/2005 |
| EP | 0863337 A2 | 9/1998 |
| LU | 39478 A1 | 1/1961 |
| WO | WO-2004/031629 A2 | 4/2004 |

OTHER PUBLICATIONS

European Search Report for 12184505.1 dated Feb. 13, 2013.

* cited by examiner

*Primary Examiner* — Craig Schneider
*Assistant Examiner* — Frederick D Soski
(74) *Attorney, Agent, or Firm* — Harness, Dickey & Pierce (57) ABSTRACT

A shut-off valve for controlling flow of a pressurized gas including a restrictor, which at its second axial end extends in a radial direction of a passage to essentially cover a mouth of the passage. Further the restrictor includes a longitudinally extending guiding member for guiding a gas flow between a gas inlet and a gas outlet when a sealing member is in a second position. The guiding member is arranged to allow gas to leave the passage in a radial direction of the restrictor.

13 Claims, 5 Drawing Sheets

IGNITION REDUCING SHUT-OFF VALVE

This application claims priority to European patent application number EP 12184505.1, filed on Sep. 14, 2012, the entire contents of which is hereby incorporated herein by reference.

TECHNICAL FIELD

The invention relates to the field of shut-off valves. In particular, it relates to reduction of ignition in such valves upon opening of the valve.

BACKGROUND

Shut-off valves are commonly used for compressed gases. However, there are several problems associated with known shut-off valves. For example, immediately after opening of the shut-off valve, the gas has a high speed. This may lead to particle impact ignition when the gas rapidly reaches non-pressurized areas as the gas may captive particles that, if they impact on some surface, may cause ignition as their kinetic energy is converted to heat.

Another problem which may arise is that adiabatic compression caused by the opening of the shut-off valve and gas entering non-pressurized areas may lead to increase in temperature of the gas for a moment. This increase in temperature may in some cases lead to the ignition of components. In particular, this is the case for components having a low auto-ignition temperature.

The above described problems particularly occur for shut-off valves used with highly oxidized gases, that is, gases having a higher share of oxygen than air, because higher oxygen content increase the probability of ignition.

There is thus a need for an improved shut-off valve for compressed gases.

SUMMARY OF THE INVENTION

In view of the above, it is thus an object of the present invention to provide a shut-off valve which reduces the risk of ignition in the shut-off valve. In particular, it is an object to provide a shut-off valve which reduces the risk of particle impact ignition upon opening of the shut-off valve.

According to the invention, the above object is achieved by the provision of a shut-off valve for controlling flow of a pressurized gas. The shut-off valve comprises a body defining a passage extending between a gas inlet and a gas outlet, and a sealing member arranged to, in a first position, close a mouth of the passage into the gas outlet, and in a second position, leave a first gap to the mouth of the passage to allow gas to flow between the gas inlet and the gas outlet through the passage. The shut-off valve further comprises an elongated restrictor arranged in the passage, the restrictor being displaceable in a longitudinal direction of the passage, and having a first and a second axial end. The shut-off valve further comprises a biasing element for biasing the first end of the restrictor such that the second end is in contact with the sealing member, wherein the restrictor at its second axial end extends in a radial direction of the passage to essentially cover the mouth of the passage, thereby being arranged to shield the sealing member from the passage in the longitudinal direction, and wherein the restrictor comprises guiding means for guiding a gas flow between the gas inlet and the gas outlet when the sealing member is in the second position, the guiding means extending in the longitudinal direction of the restrictor and being arranged to allow gas to leave the passage in a radial direction of the restrictor.

As the shut-off valve is opened by moving the sealing member from the first to the second position, gas may flow from the gas inlet to the gas outlet via the passage. Particularly, the gas flow is guided by the guiding means of the restrictor to leave the passage in a radial direction of the restrictor. This is possible since the restrictor is biased towards the sealing member such that the second axial end of the restrictor is in contact with the sealing member. Thus, as the sealing member is moved from the first to the second position, the restrictor is displaced in the longitudinal direction of the passage to follow the sealing member. Since the restrictor at its second axial end extends in a radial direction of the passage to essentially cover the mouth of the passage, thereby shielding the sealing member from the passage in the longitudinal direction, gas may not exit the restrictor in the longitudinal direction. Instead, the gas flow is guided by the guiding means to leave the restrictor is in the radial direction of the restrictor. Consequently, particles accelerated by the gas flow in the longitudinal direction of the restrictor are prevented from impacting on the sealing member. In this way, the restrictor at its second axial end acts as an umbrella for particles being accelerated by the gas flow and prevents particle impact ignition at the sealing member.

In one embodiment the guiding means comprises a cavity extending in the longitudinal direction of the restrictor, and a restrictor inlet for allowing gas to enter the cavity and a restrictor outlet for allowing gas to leave the cavity, wherein the restrictor outlet comprises a first radial opening formed in an outer surface of the restrictor extending between the first and the second axial end. For example, the restrictor may be in the form of a hollow cylinder being closed at its second axial end and having at least one radial opening in its outer surface. This is advantageous in that it is easy to manufacture.

The restrictor may comprise a second radial opening defining the restrictor inlet, the second radial opening being formed in the outer surface of the restrictor.

In one embodiment the guiding means comprises a longitudinally extending recess formed in an outer surface of the restrictor, the outer surface extending between the first and the second axial end. For example the guiding means may be in the form of a cylinder having at least one longitudinally extending recess or groove in its outer surface. This is advantageous in that it is easy to manufacture.

The sealing member may, in a third position between the first position and the second position, be arranged to leave a second gap, smaller than the first gap, to the mouth of the passage. In the first position of the sealing member the restrictor is completely contained in the passage. In the third position of the sealing member, the guiding means is contained in the passage, and is in indirect fluid communication with the gas outlet via a clearance formed between the body and the restrictor. In the second position of the sealing member, the guiding means is at least partly positioned outside the passage, in the gas outlet, such that the guiding means is in direct fluid communication with the gas outlet.

This is advantageous in that it reduces the risk of a sudden increase in temperature because of adiabatic compression caused by quick opening of the shut-off valve. More precisely, by having a third position of the sealing member where the guiding means of the restrictor is contained in the passage, the gas is limited to flow from the gas inlet to the gas outlet via the clearance formed between the body and the restrictor. Thus, upon opening of the valve, the sealing member first reaches the third position where the shut-off valve is slightly open and only a limited gas flow is possible. Then, the sealing member reaches the second position where a higher gas flow is possible since the gas may flow from the gas inlet to the gas outlet via the guiding means of the restrictor. In this way, the opening of the shut-off valve is made sequential such that there is no sudden increase in gas flow causing adiabatic compression leading to ignition due to increase in temperature.

There may be a distance between the guiding means and the second axial end of the restrictor being larger than the second gap and smaller than the first gap. In this way the guiding means are contained in the passage in the third position (corresponding to the second gap) and at least partly outside of the passage in the second position (corresponding to the first gap).

The sealing member may be held in a spindle. For example the spindle may comprise barbs for holding the sealing member. This is advantageous in that the sealing member is firmly held in place.

The spindle may comprise a front part surrounding the sealing member, and the body may comprise a matching groove surrounding the mouth of the passage into the outlet, such that the passage additionally may be closed by insertion of the front part of the spindle in the groove. This is advantageous in that the shut-off valve may be closed even in the fault condition that the sealing member is damaged or worn.

For example, the gas inlet and the passage may be arranged essentially perpendicular to each other. Also, the gas outlet and the passage may be arranged essentially perpendicular to each other.

According to one embodiment, the gas inlet and the gas outlet are arranged in parallel with a distance between them, the distance being bridged by the passage.

Generally, all terms used in the claims are to be interpreted according to their ordinary meaning in the technical field, unless explicitly defined otherwise herein. All references to "a/an/the [radial opening, etc.]" are to be interpreted openly as referring to at least one instance of said radial opening etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
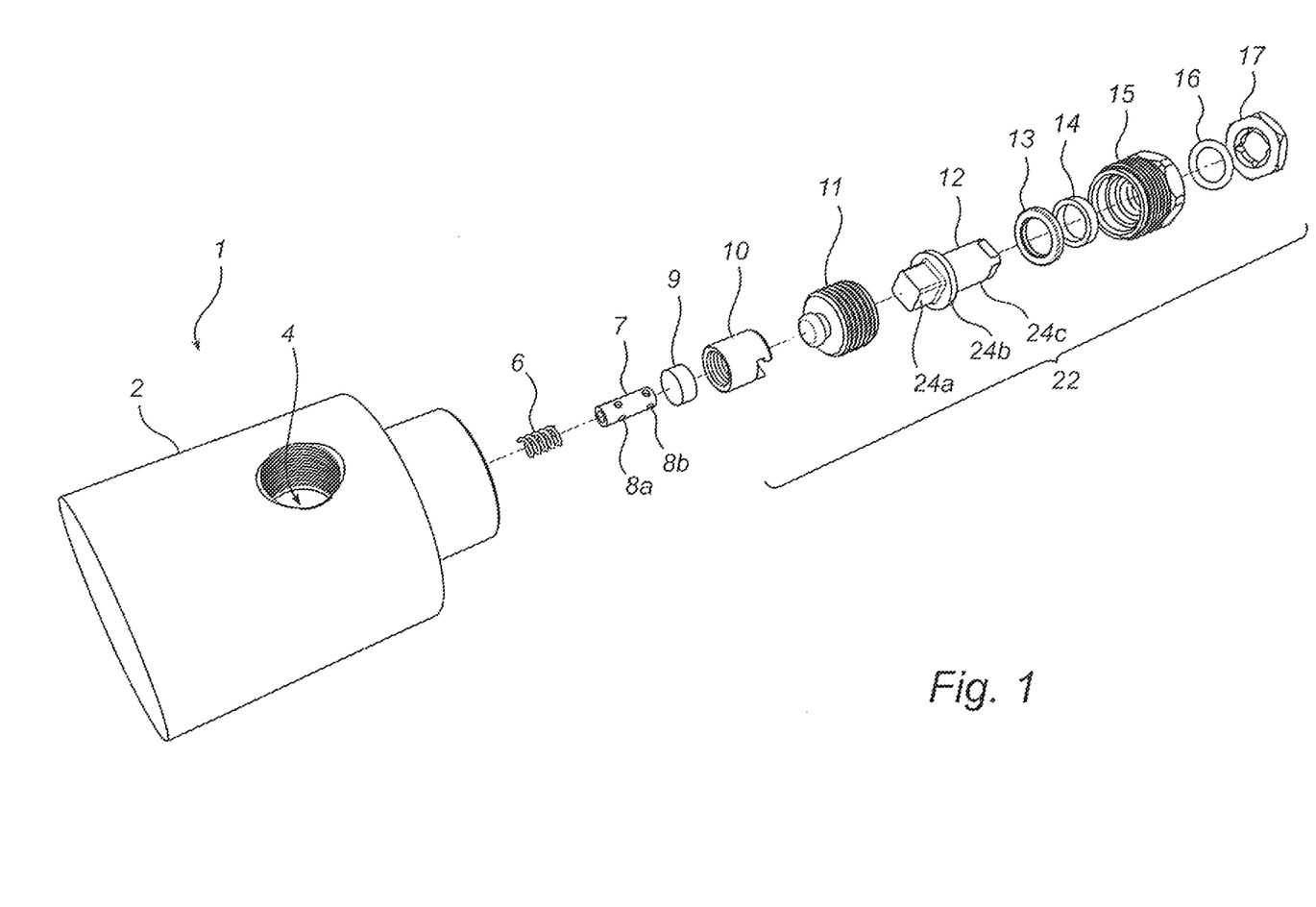
FIG. 1 is an exploded view of a shut-off valve according to an embodiment.
Figure 2:
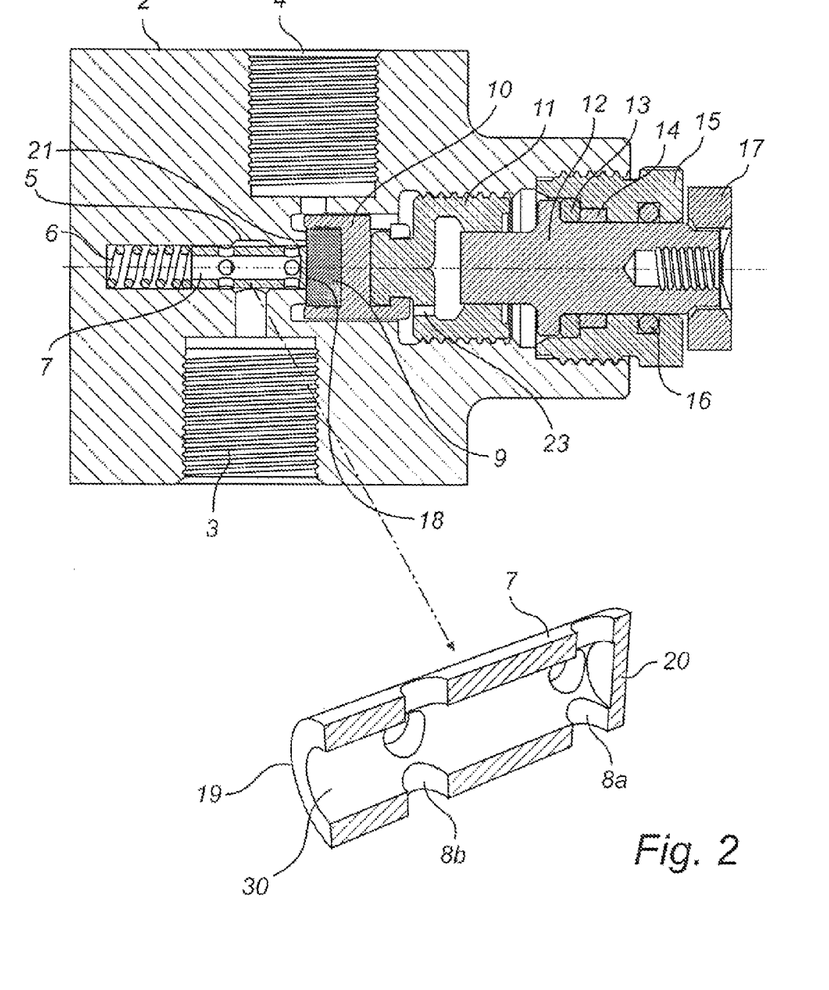
FIG. 2 is a cross-sectional side view of a shut-off valve being in a closed state and a perspective view of an enlargement of parts of a restrictor according to an embodiment.

FIGS. 1-2 illustrate structural parts of a shut-off valve 1 according to an embodiment.

The shut-off valve comprises a body 2 having formed therein an inlet 3 and an outlet 4. Here, the inlet 3 and the outlet 4 extend in a radial direction of the body 2. The inlet 3 may for example be connected to a cylinder of pressurized gas. Preferably, the body is made of metal. The body 2 defines a passage 5 extending between the inlet 3 and the outlet 4. The passage 5 has a mouth 18 into the gas outlet 4. The portion of the body 2 surrounding the mouth 20 forms a valve seat 21. In the illustrated example, the passage 5 forms an elongated cavity extending in the longitudinal direction of the body 2. Further, the illustrated passage 5 is arranged essentially perpendicular to the inlet 3 and the outlet 4. More precisely, the inlet 3 and the outlet 4 are arranged in parallel at a distance from each other, the passage 5 bridging the distance. However, as the skilled person realizes there are many alternatives for how the inlet 3, the outlet 4, and the passage 5 may be arranged relatively each other.

The shut-off valve 1 further comprises a sealing member 9, preferably formed of an elastic material. In the illustrated example, the sealing member 9 is arranged in a first position where it closes the mouth 18 of the passage 5 into the gas outlet 4. More precisely, the sealing member is in the first position in abutment with the valve seat 21 such that no gas may pass from the inlet 3 to the outlet 4 via the passage 5.

A restrictor 7 having an elongated shape is arranged in the elongated passage 5. The restrictor 7 is movably arranged in the longitudinal direction of the passage. That is, the restrictor 7 is displaceable in the passage 5. When the sealing member 9 is in its first position closing the mouth 18 of the passage 5, the restrictor 7 is completely contained in the passage 5. The restrictor 7 has a first axial end 19 facing away from the mouth 18 and a second axial end 20 facing the mouth 18.

Figure 4:
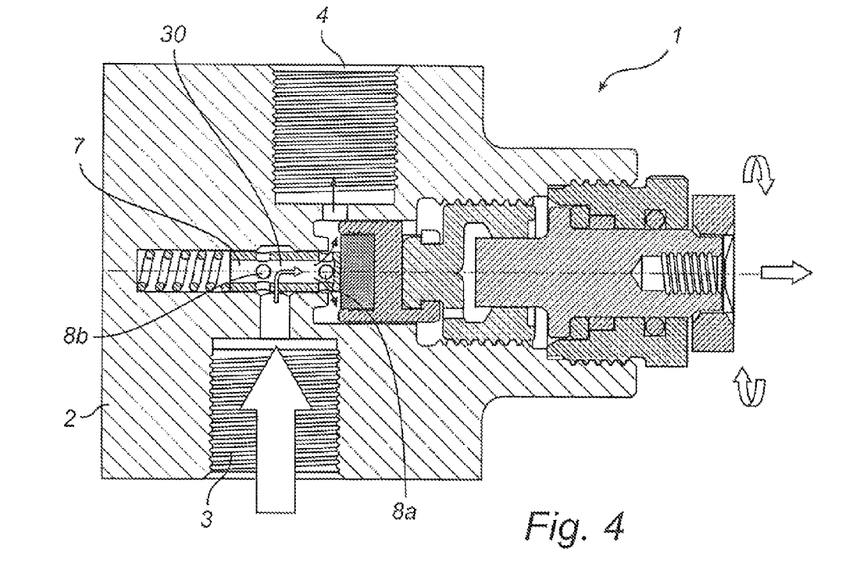
Figure 5:
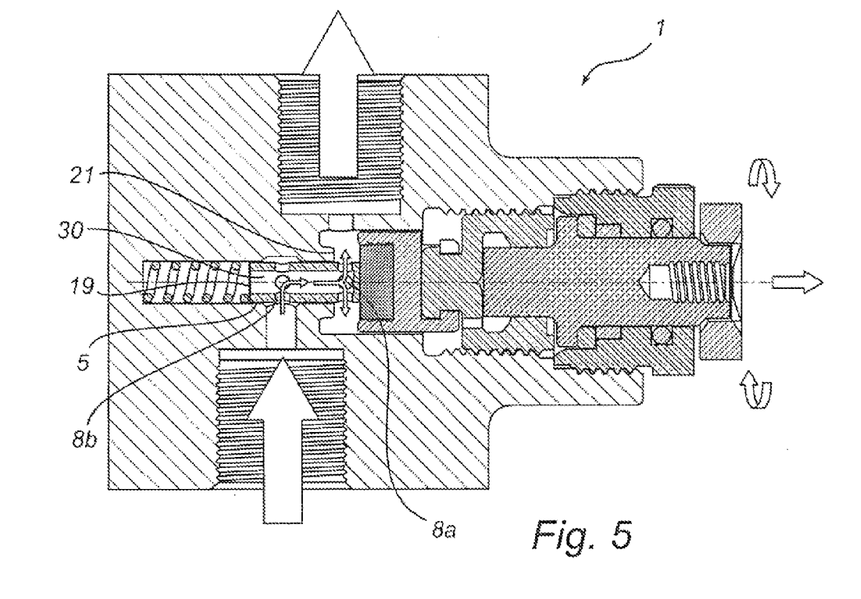
FIG. 5 is a cross-sectional side view of a fully open shut-off valve according to an embodiment.

The restrictor 7 further comprises guiding means 30 for guiding a gas flow between the gas inlet 3 and the gas outlet 4 when the shut-off valve 1 is in an open state (to be explained with respect to FIGS. 4-5). The guiding means 30 extends in the longitudinal direction of the restrictor 7. For example, the guiding means 30 may be in the form of a cavity extending in the longitudinal direction of the restrictor 7. The illustrated restrictor 7 is hollow, hence comprising a cavity extending in the longitudinal direction. For example, the restrictor 7 may be in the shape of a hollow cylinder. The restrictor 7 is preferably made of metal.

The illustrated restrictor 7 comprises a restrictor inlet 8b and a restrictor outlet 8a. The restrictor inlet 8b allows gas to enter the cavity defining the guiding means 30 and the restrictor outlet allows gas to leave the cavity defining the guiding means 30. The restrictor outlet 8a may for example be defined by one or more first radial openings formed in an outer surface of the restrictor 7, the outer surface extending between the first 19 and the second 20 axial end. The first radial openings may for example be in the form of radial bores. In this way, the restrictor 7 is arranged to allow gas to leave the passage 5 in a radial direction of the restrictor 7 when the shut-off valve 1 is in an open state.

At its second axial end 20, the restrictor 7 extends in a radial direction of the passage 5 to essentially cover the mouth 18 of the passage 5. The term essentially cover is to be interpreted in the sense that there may still be a small clearance between the body 2 and the restrictor 7 as is further disclosed below with reference to FIG. 3. This may for example be achieved by the restrictor 7 having a cross-section at its second axial end 20 being essentially the same as the size and shape of the mouth. The second axial end 20 of the illustrated hollow restrictor 7 is closed at its second end 20, meaning that no gas may exit the restrictor 7 through the second axial end 20 in the longitudinal direction. Instead, the guiding means 30 allow gas at high pressure to exit the restrictor 7 in a radial direction via the first radial openings 8a instead of in the longitudinal direction. The first radial openings 8a are preferably arranged close to but at a distance from the second axial end 20 of the restrictor 7.

The restrictor inlet 8b may comprise one or more second radial openings 8b. Similar to the first radial openings 8a, the second radial openings 8b may be in the form of radial bores. The second radial openings 8b are preferably arranged at a distance from the first axial end 19 of the restrictor 7 as further discussed below. The shut-off valve 1 further comprises a biasing element 6. The biasing element 6 is arranged in the passage 5 and acts on the restrictor 7 so as to bias the restrictor 7 towards the sealing member 9. More precisely, the biasing element 6 acts on the first axial end 19 of the restrictor 7 such that the second axial end 20 is in contact with the sealing member 9. The biasing element may for example be in the form of a spring or any other equivalent resilient means known in the art.

The shut-off valve 1 further comprises an operating mechanism 22 which allow opening and closing of the shut-off valve 1. More precisely, the operating mechanism 22 is arranged to move the sealing member 9 away or towards from the valve seat 21 in order to open or close the shut-off valve 1. Particularly, the operating mechanism 22 is arranged to move the sealing member 9 from its first position in which the shut-off valve 1 is closed, to at least a second position, where the sealing member 9 leaves a first gap to the mouth 18, such that gas may flow between the inlet 3 and the outlet 4 through the passage 5.

The skilled person realizes that there are many possible ways of designing such an operating mechanism 22. For example, the mechanism may have a rotating design such that the sealing member 9 is moved by means of a rotational movement, or a non-rotating design such that the sealing member 9 for example is moved by means of a translational movement.

The illustrated operating mechanism 22 comprises a plurality of spindle elements 10-12, a sealing 9, a washer 13, a seal 14, a nut 15, an o-ring 16, and a catch plate 17.

The sealing element 9 is arranged in a first spindle element 10, herein referred to as a lower spindle. The lower spindle 10 is arranged to hold and secure the sealing member 9. The illustrated lower spindle 10 has an essentially cylindrical shape. At the side of the lower spindle 10 facing the valve seat 21, there is a recess for receiving the sealing member 9. On the walls of the recess there may be barbs or similar means for securing the sealing member 9.

The first spindle element 10 is cooperating with a second spindle element 11, herein referred to as a driving spindle. The role of the driving spindle 11 is to push or pull the lower spindle 10 in a direction towards or away from the valve seat 21, respectively. For this purpose, the driving spindle 11 is coupled to the lower spindle by means of a bayonet coupling. Further, the driving spindle 11 is provided with threads on an outer surface facing an inner surface of the body 2. The threads on the driving spindle 11 are arranged to mate with corresponding threads on the body 1. As the driving spindle 11 rotates, it will in this way either push or pull the lower spindle 10 towards or away from the valve seat 21, thereby opening or closing the shut-off valve 1. However, the rotational movement of the driving spindle 11 is not transferred to the lower spindle 10. In this way, the wear of the sealing member 9 during opening and closing of the shut-off valve 1 is reduced. The driving spindle 11 further comprises a through hole 23 extending in the longitudinal direction. The through hole 23 is provided to allow pressure balance and avoid the driving spindle 11 to be loaded by pressure forces. In this way the thread friction and wear during use may be reduced.

The driving spindle 11 is in turn coupled to a third spindle element 12, herein simply referred to as a spindle. The third spindle element 12 is an elongated element comprising three portions 24a-c in its axial direction. The portion 24a of the spindle 12 facing the driving spindle 12 has a polygonal cross-section, here in the form of a squared cross-section. This portion 24a of the spindle 12 is arranged to be inserted in a mating hole in the driving spindle 11 having a cross-section of the same shape. By having a polygonal cross-section, a rotational motion of the spindle 12 is transferred to the driving spindle 11.

The second portion 24b arranged between the first portion 24a and the second portion 24b comprises a flange extending in an outwards radial direction of the spindle element 12. The flange 24b is arranged to cooperate with a corresponding radially inwardly extending portion of the nut 15 through a washer 13 in order to lock the spindle 12 to the body 2. Between the flange 24b and the corresponding radially inwardly extending portion of the nut 15 is arranged a washer 13. The washer 13 is provided to reduce friction and allow rotation of the spindle 12. The seal 14 is provided to avoid external leakage. The washer 13 may be provided with slots to compensate for the gas pressure.

The third portion 24c of the spindle 12 is arranged to be connected to a hand wheel (not shown) via a catch plate 17 such that the spindle 12 may be rotated. The catch plate 17 is connected to the end of the spindle 12 facing away from the driving spindle 11. Thus, by rotating the hand wheel, the spindle 12 may be rotated. The rotational motion is via the portion of polygonal cross-shape transported to the driving spindle 11, which in turn via the bayonet coupling pushes or pulls the lower spindle 10 holding the sealing member 9 towards or away from the valve seat 21. If more precise positioning of the hand wheel is needed, the radially outer surface of the catch plate 17 may be designed to have a polygonal shape, i.e., to comprise a plurality of side facets. For example, the illustrated catch plate 17 has a hexagonal shape of its radially outer surface, corresponding to six side facets. This allows the hand wheel to be positioned by 60 degrees. If more precise positioning is needed, the number of side facets may be increased.

The design of the spindle 12 allows closing of the shut-off valve 1 even at the fault condition when ignition consume the sealing member 9 and the washer 13 because the driving spindle 11 will not leave the first portion 24a of the spindle 12 due to the length of the first portion 24a having a polygonal shape of the cross-section.

The nut 15 is mounted around the spindle element 12 in order to lock spindle 12 to the body 2. The nut 15 is mounted to the body 1 by threads having a smaller pitch than the pitch of the driving spindle 11. In this way, loosening of the nut 15 during operation of the operating mechanics 22 is avoided. The nut 15 forms a sealing with the body 2 via metal-to-metal contact. Between the nut 15 and the spindle 12 there may be provided a sealing such as an o-ring 16 which prevents impurities and water to enter the shut-off valve mechanism.

Figure 7:
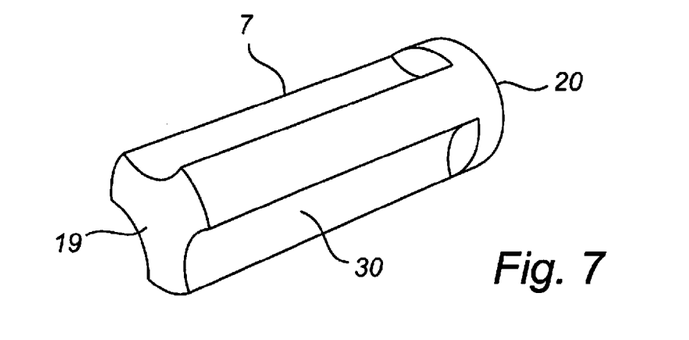
FIG. 7 is a perspective view of a restrictor according to an embodiment.

FIG. 7 illustrates an alternative embodiment of a restrictor 7. The restrictor 7 comprises guiding means 30 in the form of longitudinally extending recesses formed in an outer surface of the restrictor 7. Here, the restrictor 7 is in the form of a solid cylinder having three longitudinally extending recesses in the form of grooves extending from the first axial end 19 towards the second axial end 20. The number of recesses may be varied from one to any number. The recesses do not extend all the way to the second axial end 20. This enables the restrictor 7 to extend in the radial direction at its second axial end 20 such that it, when in use, covers the mouth of the passage of the shut-off valve. Particularly, there is a distance between the second axial end 20 and the guiding means 30. The functioning of the shut-off valve 1 as a user operates the operating mechanics 22 by turning the hand wheel to open the shut-off valve 1 will now be disclosed with respect to FIGS. 3-5. In the illustrated examples, the restrictor 7 is in the form of a cylinder. However, the skilled person realizes that the examples are equally applicable in case another embodiment of the restrictor 7 is chosen, such as the embodiment disclosed in FIG. 7.

Figure 3:
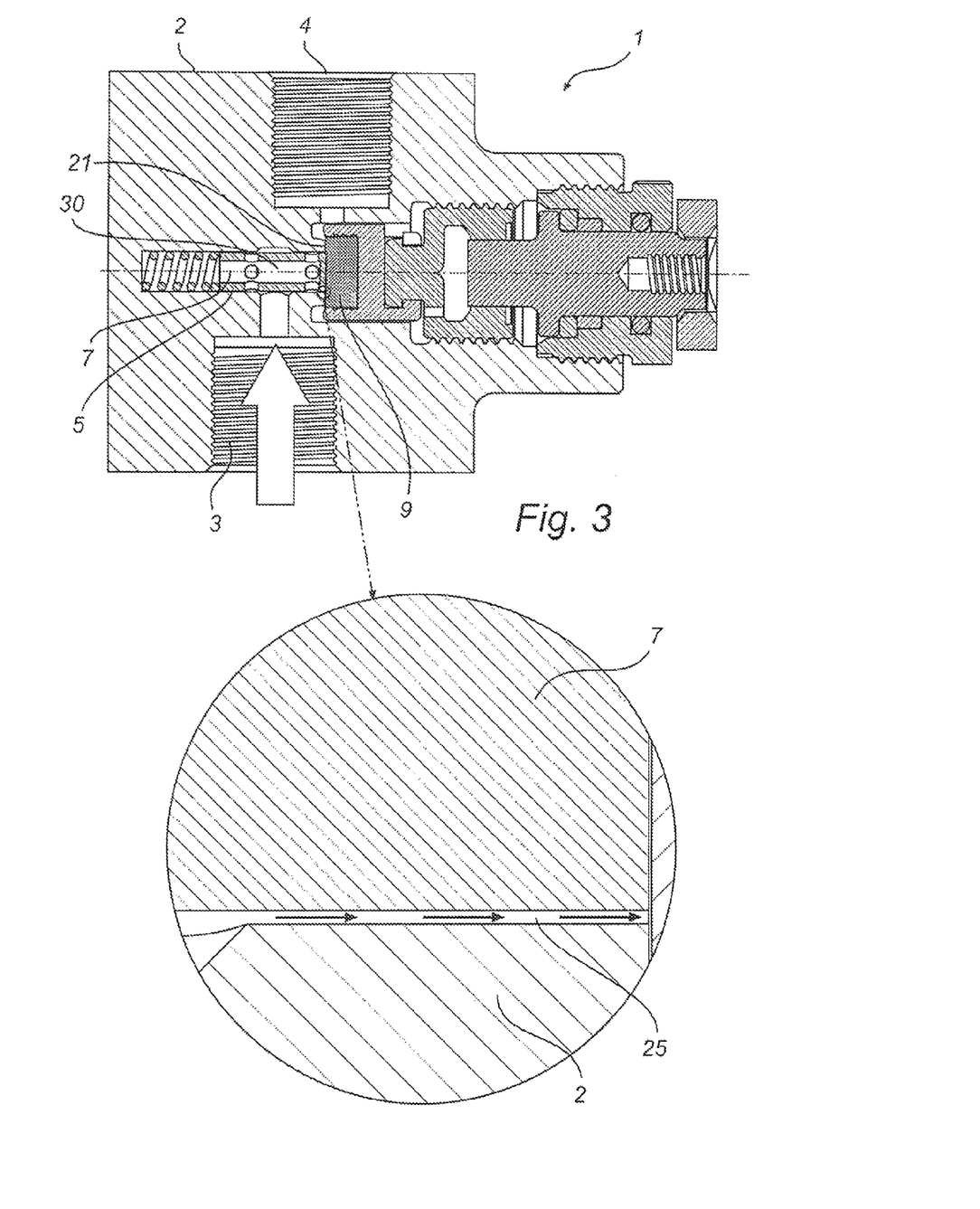
FIGS. 3-4 are cross-sectional side views of a partly open shut-off valve according to an embodiment.

In FIG. 3 a user has started to open the shut-off valve by turning the hand wheel such that the sealing member 9 just has started to leave the valve seat 21. Accordingly, the shut-off valve 1 is in a slightly open position, referred to as a first phase. As described above, the restrictor 7 is biased towards the sealing member 9 and hence follows the sealing member 9 as it moves away from the valve seat 21. In the first phase, the sealing member 9 leaves a gap to the valve seat 21 of the body 2. The gap is so small that the guiding means 30 (here illustrated by the cavity of the restrictor having first radial openings 8a) of the restrictor 7 are completely inside of the passage 5. More precisely, the gap is smaller than the distance between the second axial end 20 and the guiding means 30 of the restrictor 7. Here, the distance between the second axial end 20 and the first radial openings 8a is larger than the first gap. As a result, the restrictor 7 restricts the gas such it may only flow from the inlet 3 to the outlet 4 via a clearance 25 formed between the body 2 and the restrictor 7. In particular, the guiding means 30 (here the cavity and the first radial openings 8a) is only in indirect fluid communication with the outlet 4 via the clearance 25.

In FIG. 4, the user has continued to open the shut-off valve 1 such that the guiding means 30 (here the first radial holes 8a defining the outlet of the cavity) is partly outside of the passage 5. The phase starting when the guiding means 30 (here in the form of the first radial openings 8a) leave the passage 5 to enter into the outlet 4 is referred to as the second phase. In the second phase the gap between the sealing member 9 and the mouth 18 is larger than the corresponding gap in the first phase. In particular the gap in the second phase is larger than the distance between the second axial end 20 and the guiding means 30 (here the first radial openings 8a) of the restrictor 7. Thus, in the second phase, the guiding means (here the restrictor outlet defined by the first radial openings 8a) is at least partly in direct fluid communication with the outlet 4. As a result, gas flow is not limited to the clearance 25 between the body 2 and the restrictor 7 as in FIG. 3, but may also be guided by the guiding means 30 to leave the passage 5 in a radial direction of the restrictor 7. In the illustrated example, the gas may flow through the restrictor 7 by entering the second radial openings 8b and exiting through the first radial openings 8a. Accordingly, the direction of the gas flow leaving the restrictor 7 is, due to the first radial openings 8b in the radial direction, such that the gas flows along the sealing member 9 to the outlet 4. In this way, direct flow of gas to the sealing member 9 is avoided such that the risk of having particle impact ignition at the sealing member 9 is reduced.

The second radial openings 8a defining the restrictor inlet are preferably at least partly in direct fluid communication with the gas inlet 3 in the second phase.

In FIG. 5, the user has opened the shut-off valve 1 to a fully open position meaning. In case the guiding means is in the form of a cavity with first radial openings 8b defining an outlet, this means that the first radial holes 8a has completely left the valve seat 21 and has thereby left the passage 5. Preferably, also the second radial openings 8a are in direct fluid communication with the gas inlet 3. More precisely, the distance between the first axial end 19 and the second radial openings 8b is preferably chosen such that the second radial openings 8b fully overlaps the inlet 3 when the shut-off valve is in the fully open position. In the fully open position, the gas flow is at its full flow capacity.

As described above, the opening of the shut-off valve 1 is sequential in that it goes through two phases: the first phase when the gas is restricted to flow through the clearance 25 formed between the body 2 and the restrictor element 7; and the second phase when the gas also may be guided by the guiding means to leave the passage 5 in a radial direction of the restrictor 7. According to the illustrated example of FIGS. 4-5, the gas may flow through the restrictor element 7 via the second radial holes 8b, the cavity, and the first radial holes 8a. By having a sequential opening of the shut-off valve 1, the problem of adiabatic compression leading to a sudden increase in temperature upon quick opening of the shut-off valve is reduced. Thereby, the risk of ignition is reduced.

Figure 6:
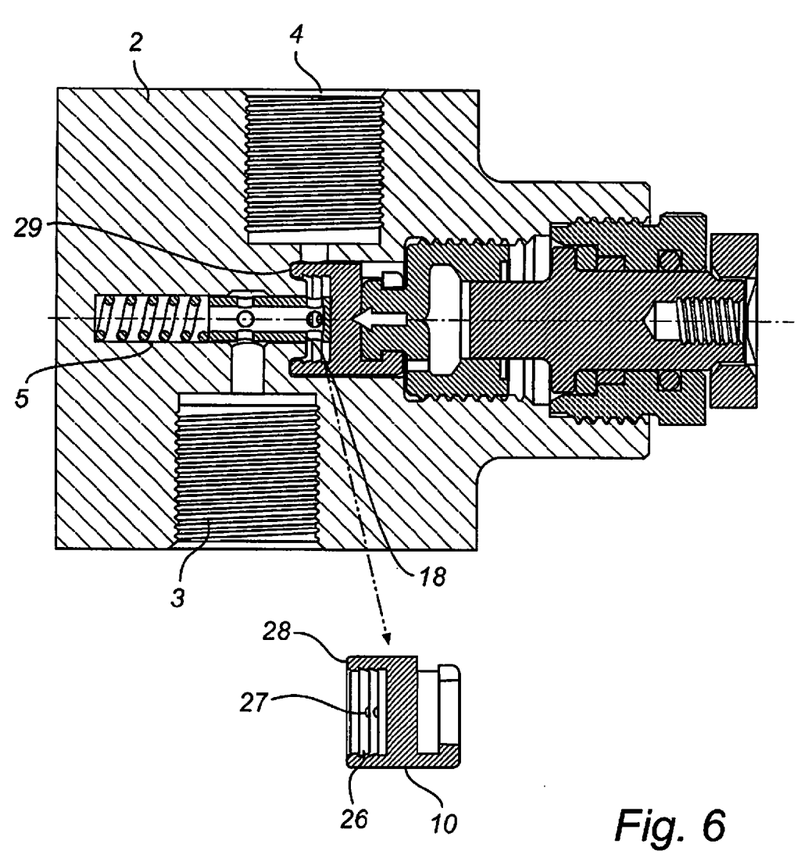
FIG. 6 is a cross-sectional side view of a closed shut-off valve in a fault state according to an embodiment.

In FIG. 6 an enlargement of the first spindle 10 is shown. The first spindle 10 comprises barbs 26 for holding the sealing member 9. The first spindle 10 is further provided with venting slots 27 for allowing gas to leave the first spindle 10 as the sealing member 9 is pressed into the first spindle 10.

The first spindle 10 further comprises a front part 28 which, in use, surrounds the sealing member 9. The front part 28 may generally have a circular or elliptic shape. The inner radial dimension of the front part 28 is preferably chosen to be larger than the outer radial dimension of the sealing member 9 in order to avoid generation of flashes upon mounting the sealing member 9 in the first spindle 10. The front part 28 is arranged to mate with a matching groove 29 which surrounds the mouth 18 of the passage 5. As shown in FIG. 6, this allows the shut-off valve 1 to be closed even in the fault state when the sealing member 9 is destroyed or damaged due to ignition, is missing or is heavily worn. More precisely, by means of the operating mechanics 22, the front part 28 of the first spindle 10 may be inserted into the groove 29 to form a gas tight sealing via metal-to-metal contact. As the front part 28 is inserted into the groove 29 no gas may hence flow from the inlet 3 to the outlet 4. Even if there are left remains of the sealing member 9, the gas tight sealing is possible.

It will be appreciated that a person skilled in the art can modify the above-described embodiments in many ways and still use the advantages of the invention as shown in the embodiments above. For example, the orientation and design of the inlet 3 and outlet 4 may vary depending on need. It may for instance be possible to arrange the inlet in a parallel design with the passage. It should also be noted that the reverse gas flow, for example for the purpose of filling a gas cylinder, is also possible. Thus, the invention should not be limited to the shown embodiments but should only be defined by the appended claims.

The invention claimed is:

1. A shut-off valve for controlling flow of a pressurized gas, comprising:
a body defining a passage extending between a gas inlet and a gas outlet, and a sealing member arranged to, in a first position, close a mouth of the passage into the gas outlet, and in a second position, leave a first gap to the mouth of the passage to allow gas to flow between the gas inlet and the gas outlet through the passage,
an elongated restrictor arranged in the passage, the restrictor being displaceable in a longitudinal direction of the passage, and having a first and a second axial end, and
a biasing element configured to bias the first end of the restrictor such that the second end is in contact with the sealing member,
wherein:
the second axial end of the restrictor extends in a radial direction of the passage to essentially cover the mouth of the passage, thereby being arranged to shield the sealing member from the passage in the longitudinal direction, and
the restrictor includes a guiding element configured to guide a gas flow between the gas inlet and the gas outlet when the sealing member is in the second position, the guiding element extending in the longitudinal direction of the restrictor and being arranged to allow gas to leave the passage in a radial direction of the restrictor.

2. The shut-off valve according to claim 1, wherein the guiding element comprises a cavity extending in the longitudinal direction of the restrictor, and a restrictor inlet for allowing gas to enter the cavity and a restrictor outlet for allowing gas to leave the cavity, wherein the restrictor outlet comprises a first radial opening formed in an outer surface of the restrictor extending between the first and the second axial end.

3. The shut-off valve of claim 2, wherein the restrictor comprises a second radial opening defining the restrictor inlet, the second radial opening being formed in the outer surface of the restrictor.

4. The shut-off valve of claim 1, wherein the guiding element comprises a longitudinally extending recess formed in an outer surface of the restrictor, the outer surface extending between the first and the second axial end.

5. The shut-off valve of claim 1, wherein the sealing member, in a third position between the first position and the second position, is arranged to leave a second gap, smaller than the first gap, to the mouth of the passage,
wherein the restrictor in the first position of the sealing member is completely contained in the passage,
wherein the guiding element in the third position of the sealing member is contained in the passage, and is in indirect fluid communication with the gas outlet via a clearance formed between the body and the restrictor, and
wherein the guiding element in the second position of the sealing member is at least partly positioned outside the passage, in the gas outlet, such that the guiding element is in direct fluid communication with the gas outlet.

6. The shut-off valve of claim 5, wherein there is a distance between the guiding element and the second axial end of the restrictor being larger than the second gap and smaller than the first gap.

7. The shut-off valve of claim 1, wherein the sealing member is held in a spindle.

8. The shut-off valve of claim 7, wherein the spindle comprises barbs for holding the sealing member.

9. The shut-off valve of claim 7, wherein the spindle comprises a front part surrounding the sealing member, and the body comprises a matching groove surrounding the mouth of the passage into the gas outlet, such that the passage additionally may be closed by insertion of the front part of the spindle in the groove.

10. The shut-off valve of claim 1, wherein the gas inlet and the passage are arranged essentially perpendicular to each other.

11. The shut-off valve of claim 1, wherein the gas outlet and the passage are arranged essentially perpendicular to each other.

12. The shut-off valve of claim 1, wherein the gas inlet and the gas outlet are arranged in parallel with a distance between them, the distance being bridged by the passage.

13. The shut-off valve of claim 8, wherein the spindle comprises a front part surrounding the sealing member.

* * * * *